United States Patent [19]

Gitlitz et al.

[11] Patent Number: 4,532,269

[45] Date of Patent: Jul. 30, 1985

[54] ERODIBLE TERPOLYMER FROM TRIBUTYL TIN ACRYLATE OR METHACRYLATE AND PAINTS FOR FOULING CONTROL

[75] Inventors: Melvin H. Gitlitz, Edison; David B. Russell, Piscataway; Howard H. Leiner, Cranbury, all of N.J.

[73] Assignee: M&T Chemicals Inc., Woodbridge, N.J.

[21] Appl. No.: 592,635

[22] Filed: Mar. 23, 1984

[51] Int. Cl.[3] ............................................. C08L 33/08
[52] U.S. Cl. .................................... 523/122; 526/240
[58] Field of Search ......................... 523/122; 526/240

[56] References Cited

U.S. PATENT DOCUMENTS 4,064,338 12/1977 Russell ................................ 526/240
4,157,999 6/1979 Matsuda et al. .................... 523/122

*Primary Examiner*—Harold D. Anderson
*Attorney, Agent, or Firm*—S. H. Parker; J. Matalon; R. E. Bright

[57] ABSTRACT

A novel polymeric binder for an antifouling paint includes greater than 2.5 to less than 25 mole percent of a unit from a tributyltin acrylate or methacrylate monomer group, an acrylic or methacrylic ester monomer unit having selected substituent groups in the ester moiety so that the ester is hydrolyzable at a suitable rate in seawater, and a copolymerizable ethylenically unsaturated monomer unit.

The presence of the hydrolyzable ester group in the polymer binder of the present invention enables the paint to erode at a desired rate in seawater even with the low tin content in the polymer, thereby providing a desired low level of tin in solution and exposing a fresh paint surface periodically.

8 Claims, No Drawings

ERODIBLE TERPOLYMER FROM TRIBUTYL TIN ACRYLATE OR METHACRYLATE AND PAINTS FOR FOULING CONTROL

BACKGROUND OF THE INVENTION

The control of marine fouling on ships and marine structures has been a problem for thousands of years. In the 20th century this problem has been addressed primarily by the use of coatings containing chemicals toxic to marine organisms. Conventional coatings used for fouling control are based on a film-forming resin and toxin additives such as cuprous oxide or triorganotin compounds which are slowly leached out of the coating by sea-water. Frequently the paint composition contains a slightly water-soluble resinous material such as gum rosin which assists the leaching process.

An example of such a "soluble matrix" paint formulation is given in Table 1.

TABLE 1

Soluble Matrix Copper Oxide Antifouling Paint U.S. Navy 121/63 Formula

| Ingredient | Pounds | Gallons |
| --- | --- | --- |
| Cuprous oxide | 1440 | 50.0 |
| Rosin | 215 | 24.1 |
| Vinyl resin (VYHH)[a] | 55 | 4.7 |
| Tricresyl phosphate | 50 | 11.7 |
| Xylene | 115 | 16.1 |
| MIBK | 165 | 24.7 |
| Antisettling agent | 7 | 1.0 |

[a]Union Carbide

Such paint system, however, fail to provide a constant toxicant release, and moreover, do not erode in service. This is due to the selective extraction of the water-soluble component and consequent leaching of toxicant (cuprous oxide) from the interior of the paint film. A matrix of the insoluble vinyl resin component remains behind after the water-soluble component of the film (gum rosin) is leached away. Moreover, the spent paint film no longer controls fouling even though it might contain up to 30-40% of the initial level of cuprous oxide because water penetration required for leaching the copper to the surface is limited through the matrix of residual vinyl resin. Spent antifouling systems of this type do not provide a suitable base for repainting since they posses poor mechanical properties due to the voids in the film which result in poor adhesion of the new paint film.

Prior art attempts to incorporate toxicants into water soluble polymers and to use these as antifouling paints have also failed to produce the desired results. Such paints swell in seawater and cannot be expected to provide good mechanical properties and uniform control of fouling since the whole paint film is weakened on prolonged water immersion. Even such paint compositions as described in British Patent Specification No. 1,584,943 do not provide optimum control of fouling because the paint binder consists of a physical mixture of water insoluble and synthetic water-soluble polymeric binders wherein the synthetic water-soluble polymeric binder is substituted for the natural gum rosin of the previously described paint system. In the paint systems of British Patent Specification No. 1,584,943, the water-soluble polymeric component can be selectively extracted from the binder system by seawater leading to the same problems encountered with traditional vinyl/rosin systems. Moreover, on prolonged immersion in water, some portion of the water-soluble resin component can cause the film to absorb water and swell throughout its thickness yielding a film with poor mechanical properties.

In recent years, so-called self-polishing antifouling coatings have become increasingly popular. These coatings are based on copolymers of tributyltin methacrylate and methyl methacrylate or terpolymers of tributyltin methacrylate, methyl methacrylate and 2-ethylhexyl acrylate or butyl methacrylate. The organotin copolymer acts as the paint binder. All such paints also contain a toxicant additive such as cuprous oxide or a triorganotin compound. In addition the usual paint additives such as pigments, thixotropic agents, etc. may also be present. In normally alkaline seawater, the polymeric organotin binder is gradually hydrolyzed liberating bis(tributyltin)oxide which is an active antifoulant and also allowing the release of cuprous oxide or other physically-bound toxicants. The hydrolyzed polymer which is also formed is water-soluble or water-swellable and is easily eroded off the surface by moving sea-water, exposing a fresh surface of paint. The major advantage of these systems is that, unlike leaching paints, toxicant release is linear with time and all of the toxicant present is utilized over the lifetime of the paint. Furthermore, there is no need to remove the residues of an old self-polishing paint system prior to repainting, since the composition of the residue is essentially the same as it was when originally applied unlike conventional antifouling paints which leave a weak, leached-out matrix of binder on the ships' hull at the end of their lifetime. An additional advantage claimed for such systems is a reduction in hull surface roughness with time as a consequence of water-planing or erosion of the paint film. This roughness reduction translates to fuel savings for the ship operator.

Such erodible, antifouling coatings based on organotin copolymers and the mechanism by which they function are described in Journal of Coatings Technology, Vol. 53, Number 678, pages 46-62. The organotin copolymer serves two purposes in these systems. First it serves as a reservoir of tributyltin oxide which is gradually liberated over a period of time. Secondly it confers upon the polymer the unique property of sensitivity to hydrolysis by alkaline seawater. After hydrolysis, the polymer becomes seawater soluble or erodible. The erosion of such paint films is manifested by a gradual decrease of film thickness with time as the paint is exposed to moving seawater. In the laboratory, this erosion can be measured qualitatively by stripes of paint placed on a spinning disc immersed in seawater as described in U.S. Pat. No. 4,021,392 (Milne and Hails). Quantitative determination of erosion can be made by exposing panels coated with the test paint on a rotating drum immersed in seawater as described in Journal of Oil & Colour Chemists Association, Vol. 56, 1973, pages 388-395 and measuring the decrease of film thickness with time using a commercial electronic film thickness gauge.

Upon carrying out such erosion rate measurements on organotin acrylate or methacrylate copolymer films alone without any pigments or other additives, surprisingly it has been found that the erosion rate is a function of the reacted tributyltin methacrylate content of the copolymer. Moreover, there is an unexpected non-linear relationship between the polymer bound triorganotin content and the erosion rate.

Sea-going vessels usually have between 2 and 4 coats of antifouling paint, each coat of 100 microns film thickness, applied to the hull. This coating, of 200 to 400 microns total film thickness, is expected to last for two or three years which is the normal time between dry-dockings.

A simple calculation shows that to achieve the necessary lifetime, the erosion rate of such paints must fall in the range of 5 to 15 microns per month. An organotin copolymer which erodes at 12 microns per month must contain about 29 mole percent tributyltin methacrylate in the copolymer or about 46% by weight tributyltin groups. It has also been recognized by Milne and Hails in U.S. Pat. No. 4,021,392 that the organotin polymer must contain about 50% or more by weight of tributyltin salt units in order to generate the water-soluble polymer at a sufficient rate. A polymer with a surface dissolution rate of 12 microns per month and a specific gravity of 1.23, the normal range for such organotin polymers, release 49 micrograms of polymer per day for each square centimeter of surface area. Concommitantly, 23 micrograms of tributyltin are released per square centimeter per day which is equivalent to 9.4 micrograms of tin released from each square centimeter of ships' hull per day. Chromcy and Uhacz in Journal of the the Oil & Colour Chemists Associations, Volume 61, pages 39 to 42 (1978) have estimated that to control marine growth in the Baltic Sea, a release rate of between 0.4 and 0.7 micrograms of tributyltin per square centimeter per day is required. Even if it is assumed that in tropical waters this requirement must be increased five-fold, it is clear that polymeric organotin coatings release more organotin than is necessary to provide control of marine fouling. This is a consequence of the necessity to have a sufficient content or organotin in the polymer to allow the erosion mechanism by which these coatings function to proceed. This results in an unnecessarily large influx of toxicant into the environment and an unnecessarily high cost due to excess tin in the polymer. However it has been shown above that below this relatively high tin content, the polymers do not erode and the resulting antifouling coatings are not efficacious in controlling marine growth.

This can be demonstrated by preparing the same model paints using polymers of tributyltin methacrylate (TBTM) and methyl methacrylate with varying TBTM contents as the polymeric binder and evaluating their performance in static tests in Biscayne Bay, Fla. according to the following procedure.

EVALUATION METHOD-AF COATINGS

Panel Preparation—Fiberglass panels (8"×10") were solvent stripped, then sanded to insure adhesion of the coatings.

Paint was applied in the center of the panels to a dry film thickness of approximately 100 microns with a draw down blade applicator. The outer edges were uncoated and provided a measure of the total fouling challenge.

Panel Exposure—The panels were suspended from rafts in Biscayne Bay, Fla. The submerged racks hold 8 panels, one foot below the surface—with 2 inches of space between panels. The waterline panels are exposed with about 6 inches protruding above the water surface with about 14 inches between panels.

Fouling Rating (FR)—Fouling is rated as follows:
0=no fouling
+=very slight fouling
++=moderate fouling
+++=heavy fouling
++++=completely fouled.

PREPARATION OF POLYMERIC BINDERS

Tributyltin methacrylate-methyl methacrylate copolymers of varying TBTM contents were prepared as described in U.S. Pat. No. 4,064,338, Example 1.

Paints containing a high level of cuprous oxide, an accepted antifoulant, were prepared and tested for fouling resistance. The test paint composition and method of preparation are described below.

| Test Paint A Composition | |
|---|---|
| Ingredient | grams/1500 ml paint |
| Xylene | 260.7 |
| Fumed Silica | 29.7 |
| tributyltin methacrylate copolymer[1] (50% solution in xylene) | 724.2 |
| Paint Stabilizer[3] | 30.0 |
| Cuprous Oxide | 1173.9 |
| Dispersing Aid[4] | 3.0 |
| Methyl Isobutyl Ketone | 31.5 |

[1]organotin copolymers prepared as described in U.S. Pat. No. 4,064,338.
[2]A-2989 Toluidine Toner, Ciba-Geigy, Ardsley, N.Y.
[3]Viscostab, M & T Chemicals Inc., Rahway, N.J.
[4]Zonyl FSP, Dupont Co., Wilmington, Delaware

Test Paint A Preparation

The fumed silica is dispersed in xylene with a moderate speed dispersator (Cowles-type). One half of the polymer solution and one half of the paint stabilizer are slowly added, followed by the dispersing aid and the cuprous oxide. The resultant paste is ground in a water-cooled shot mill. The mill is washed with a mixture of the ketone and the remainder of the polymer solution and the stabilizer into the paste. The well-mixed paint is passed through the shot mill once more and checked for a desired fineness of grind (Hegman gauge) of 4–6. The paint is adjusted for a final viscosity of 1,000 to 1,500 cps (Brookfield) with solvent.

TABLE 2

Effect of Tin Content on Polymer Paint Performance
Miami Exposure Results

| Paint No. | Mole % TBTM in Polymer Binder | Fouling Rating | | | |
|---|---|---|---|---|---|
| | | 3 Mo. | | 6 | |
| | | S | W/L | S | W/L |
| A-1 | 33 | 0 | 0 | 0 | 0 |
| A-2 | 25 | 0 | 0 | 0 | 0 |
| A-3 | 20 | 0 | ++ | + | ++ |

S = submerged
W/L = waterline
A - designates high copper paint Type A.

The above data in Table 2 shows the dramatic decrease in antifouling performance when the tributyltin content in the polymer binder is decreased below 25 mole % even in the presence of high levels of cuprous oxide. It is evident from these results that no hydrolysis or erosion is taking place and the cuprous oxide is not being released to control fouling.

Simple acrylate ester copolymers containing low levels of triorganotin acrylates or methacrylates are proposed as vehicles for paints which are gradually planed away by moving seawater in U.S. Pat. No. 4,407,997, published Oct. 4, 1983. This fact is inconsistent with the known water resistance of poly(methyl acrylate) films which as described in Kirk-Othmer Encyclopedia of Polymer Science and Technology (Vol. 1, pages 246-328, 1964), are only slightly attacked even by strong aqueous solutions of sodium hydroxide or sulfuric acid at room temperature. These and similar paints free of organotin acrylate are also described in British Patent Application No. 2,087,415A. It has been found, from erosion tests on a rotating drum as described above, that model paints based on such copolymers as described in British Patent Application No. 2,087,415A and U.S. Pat. No. 4,407,997 do not erode under practical conditions simulating ship operations. The results are shown below in Table 3.

TABLE 3

| Polymer Composition[1] | | | Paint[5] Erosion Over 140 Days (microns) |
|---|---|---|---|
| MA[2] Wt % (M %) | MMA[3] Wt % (M %) | TBTM[4] Wt % (M %) | |
| Polymer A: 70 (73) | 30 (27) | — | 0 |
| Polymer B: 20 (31.4) | 40 (54.1) | 40 (14.5) | 0 |

[1]polymers prepared as described in U.S. Pat. No. 4,064,338 (example 1).
[2]MA = methyl acrylate
[3]MMA = methyl methacrylate
[4]TBTM - tributyltin methacrylate
[5]Paints contained cuprous oxide and zinc oxide as toxicant and pigment and were prepared as described in Test Paint A Preparation above.

This illustrates that simple acrylate esters do not provide eroding paits and even the inclusion of a relatively high level of tributyltin methacrylate does not provide a measurable erosion rate. Thus methyl acrylate/tributyltin methacrylate copolymers do not behave differently than normal methyl methacrylate/tributyltin methacrylate copolymers of the prior art and require a certain minimum level of tributyltin methacrylate to erode.

Further background is found in European Patent Application No. 0069559, published Jan. 12, 1983, which discloses that although triorganotin polymers are effective antifouling agents, they are expensive to employ and there are some circumstances where the release of triorganotin ions is preferably avoided or reduced while still obtaining the benefits of smoothing of the paint in service by an erosion mechanism. The patent application discloses the substitution of quinolinyl (or substituted quinolinyl) groups for the organotin groups in acrylate copolymers. The approach of this disclosure replaces one expensive toxicant with another of equally high cost but fails to provide a means for controlling the erosion rate which is independent of the polymer-bound toxicant release rate.

SUMMARY OF THE INVENTION

Surprisingly, it has been found that the tributyltin acrylate or methacrylate residues in the prior art organotin polymers can be substituted, in part, by tin-free functional organic acrylate or methacrylate monomers without compromising the antifouling performance of these systems or their erosion characteristics.

In accordance with the present invention, a paint is provided which is produced from a binder polymer resulting from the copolymerization of one or more copolymerizable ethylenically unsaturated monomers and tributyltin methacrylate or acrylate monomer and a monomer having a functional group which is hydrolyzable in seawater.

An antifouling paint is provided which includes one or more toxicants which control marine fouling, pigments and the novel polymeric binder described above. The paint formulation may also include an erosion modifying component which can be either an additive retarder, as described in U.S. Pat. No. 4,021,392 or a secondary binder of the types described in U.S. Pat. No. 4,260,535 and British Patent No. 1,589,246.

The polymeric binder is film-forming, water insoluble, seawater erodible and is represented by the formula

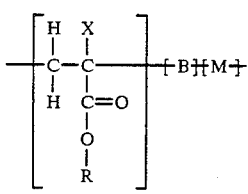

wherein, in one embodiment,

X is H or CH$_3$;

M is less than 25 mole % of the saturated residue of a tributyltin acrylate or methacrylate group;

R is a substantially non-bioactive, substituted alkyl, aryl or arylalkyl moiety and recurring groups B, where B is the residue of an ethylenically unsaturated monomer.

The polymer has a hydrolysis rate of at least $5 \times 10^{-4}$ milliequivalents per hour. The resultant paint has an erosion rate of at least 2 microns per month.

R can be selected from the group consisting of:

(a)

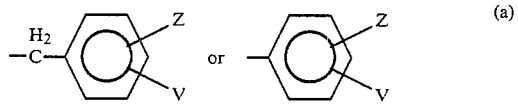

wherein

Z is NO$_2$, halogen or CN; V is H, NO$_2$, halogen, CN, or alkoxy;

(b) —(CH$_2$)$_n$Y wherein n is an integer from 1 to 4; and

Y is selected from the group consisting of

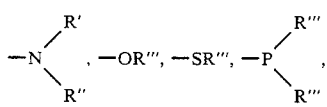

and wherein

R' is C$_1$ to C$_4$ primary, secondary or tertiary alkyl,

R" is H or R';

R''' is alkyl or an aryl;

(c) can be —SiR$_3$''' or —Si(OR''')$_3$;

(d) R can be a haloalkyl group having at least one trihalomethyl group where the halogen is Br, F, Cl, and the alkyl has at least two carbon, e.g. trifluoroethyl acrylate;

(e) a quaternized aminoalkyl represented by the formula

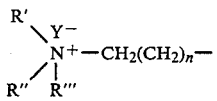

where
Y is Br, Cl or I,
R', R" and R'" are the same or different $C_1$ to $C_{18}$ alkyls.

The instant invention overcomes the problems of the prior art in achieving practical erosion rates in seawater without undue release of organotin to the environment and without the cost penalties associated with the incorporation of sufficient tin to attain these erosion rates in the absence of the functional acrylate monomers.

DETAILED DESCRIPTION OF THE INVENTION INCLUDING THE PREFERRED EMBODIMENTS

Superior control of fouling on shipbottoms with lower release of tin to the environment is achieved by the use of coatings based on polymers which slowly hydrolyze in seawater and an inorganic or organic toxicant which is slowly released as the organic polymeric binder is hydrolyzed. The paint is produced from a binder polymer resulting from the copolymerization of (1) at least one acrylic or methacrylic ester having a functional group which produces a polymer which is hydrolyzable in seawater, (2) one or more copolymerizable ethylenically unsaturated monomers and (3) tributyltin methacrylate or acrylate. These paints erode in moving seawater.

It has been shown that conventional acrylate esters, e.g. ethyl acrylate, methyl methacrylate and butyl acrylate do not hydrolyze at a sufficient rate to be used in achieving a carboxylate containing polymer, which is sufficiently sensitive to erosion by the action of seawater, to produce an antifouling paint. Introducing low levels of tributyltin methacrylate does not correct this situation.

However, it has now been found that it is possible to modify the ester to produce enhanced hydrolytic sensitivity of the polymer. This can be accomplishd by providing a functional group which assists or enhances the attack by hydroxyl ions or by weakening the ester bond. Such a polymer, in combination with low levels of copolymerized tributyltin methacrylate or acrylate provides a sea-water erodible paint binder.

In a monomer represented by the formula

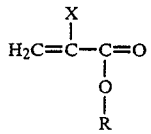

R can be

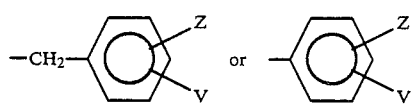

wherein
Z is $NO_2$, halogen or CN,
V is H, $NO_2$, halogen, CN or alkoxy.

An example is p-nitrophenyl acrylate.
R can also be represented by the formula:

$$-(CH_2)_nY$$

wherein
n is an integer from 1 to 4; and
Y is selected from the group consisting of

as for example dimethylaminoethyl methacrylate;
—OR'", as for example methoxyethyl acrylate;
—SR'", as for example methylthioethyl acrylate; and p-aminophenylthioethyl acrylate; and

as for example diphenyl phosphinoethyl acrylate;
wherein
R' is $C_1$ and $C_4$ primary, secondary or tertiary alkyl;
R" is H or R';
R'" is alkyl or an aryl.
It should be understood that references to alkyls, aryls and the like is intended to include substituted alkyls, aryls, etc.

R can also be —SiR'"$_3$ or —Si(OR'")$_3$, where R'" is an alkyl or an aryl, as for example triphenylsilyl acrylate.

R can also be a quaternized aminoalkyl represented by the formula

where
Y is Br, Cl or I;
R', R" and R'" are the same or difference $C_1$ to $C_{18}$ alkyls.

In another embodiment R is a haloalkyl having at least one trihalomethyl group, where the halogen is Br, F or Cl and the alkyl has at least two carbons, as for example trifluoroethyl acrylate. Typical of the haloalkyl alcohols are the compounds described in DuPont Zonyl ® Fluorosurfactants Product Information Bulletin 8/82.

It should be noted that the term alkyl as employed herein is intended to be understood to mean the generic term which is inclusive, for example, of linear, branched, cyclo and substituted alkyls.

It should be noted that reference to the monomer is not intended to indicate that the polymer must be synthesized by copolymerization of a particular monomer with a comonomer. For example, the polymer can be produced by adduction to a preformed acrylic or methacrylic acid polymer. The resultant polymer will include a recurring group represented by the structure

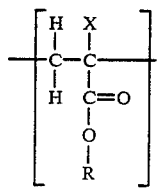

and the recurring group will correspond to a monomer

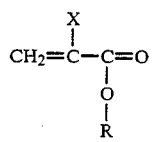

The paint formulation includes the polymeric binder, a solvent, a toxicant and can include a water sensitive pigment component, which can be a toxicant, inert pigments and fillers along with a retarder. U.S. Pat. No. 4,260,535, British Patent No. 2,087,415A and U.S. Pat. No. 4,191,579 are noted to contain descriptions of typical paint components and are incorporated by reference.

Antifouling toxicants include tributyltin fluoride, triphenyltin hydroxide, triphenyltin fluoride, tributyltin oxide, triphenyltin chloride, $Cu_2O$, $ZnO$, dithiocarbamate derivatives and cuprous thiocyanate.

The paint formulation employs sufficient solvent to enable the system to be applied to the surface to be protected. The pigment volume concentration (PVC) should be in the 10 to 50 range, and preferably is from about 30 to 45.

The upper limit for the hydrolysis of the polymer used in the paint is not of critical importance because even with an excessively rapidly hydrolyzing polymer, a desired erosion rate can be achieved by proper selection of the ratio of functional group to polymer or copolymer or the use of a retarder as disclosed in U.S. Pat. Nos. 4,021,392; 4,260,535; and British Pat. No. 1,589,246, the disclosures of which are incorporated herein by reference.

The erosion rate of the paint is dependent upon the total contributions of the functional group, the comonomer and other components, such as toxicant(s), pigment(s), retarder(s), fillers, inerts or other non-volatile components of the paint.

The functional group of the present invention and the organotin acrylate content can work in conjunction with known erosion rate controls or in place of known means to regulate the erosion rate.

The amount of the organic hydrolyzable acrylate or methacrylate relative to the final copolymer, on a mole basis, in 100 parts of the copolymers, is from 10 to 50 parts.

The amount of tributyltin methacrylate or acrylate in the final copolymer can range from at least 2.5% to below 25% on a molar basis. The relative ratios or organic hydrolyzable acrylate monomer, tributyltin methacrylate monomer and inert ethylenically unsaturated comonomers may be determined by actual erosion rate tests as previously described or by measuring the hydrolysis rate of the ground polymer by the method to be described.

The ethylenically unsaturated comonomers are well known in the film forming art and are identified for example, in British No. 2,087,415A, page 1, lines 56 to 59, and U.S. Pat. No. 4,021,392, column 4, lines 33 to 41, the disclosures of which are incorporated by reference.

The superior control of the erosion rate relies on chemically tailoring the polymer so that it is selectively weakened at certain points pendant to the polymer chain at the paint/water interface. These weak links are slowly attacked by seawater allowing the polymer to gradually become seawater soluble or seawater swellable. This weakens the hydrolyzed surface polymer film to such an extent that moving sea-water is able to wash off this layer and thus expose a fresh surface. By way of contrast with the prior art systems, in the system of the present invention the paint is relatively impermeable to seawater until hydrolysis of the outer microlayer takes place. The hydrolyzed microlayer is then sequentially removed by the water "friction".

A portion of the monomeric units are provided with functional groups which provide a site of weakness, that is, sites which tend to hydrolyze in the presence of seawater. The ratio of functionalized monomers to non-functionalized monomers is controlled to provide control of the erosion rate.

COPOLYMER PREPARATION

The solution polymerization of a 40 mole percent dimethylaminoethyl methacrylate (DMAEMA)/10 mole percent tributyltin methacrylate (TBTM) copolymer is carried out as follows:

| Ingredients | Parts by wt. |
| --- | --- |
| DMAEMA | 19.7 |
| TBTM (50% solution in xylene) | 23.6 |
| Butyl methacrylate (BMA) | 8.9 |
| Methyl methacrylate (MMA) | 9.4 |
| Vazo 64[1] | 0.2 |
| Xylene | 38.2 |
| | 100.0 |

[1]DuPont Co., Wilmington, Del.

Procedure (1) Charge all ingredients to a glass four neck resin reactor containing a stainless steel stirrer, condenser, nitrogen inlet, a thermometer with a temperature sensing-controlling head attached. Heating is by a heating mantle.

(2) Under a nitrogen atmosphere, heat to 80° C. in 1 hour with stirring, hold for 6 hours with stirring, cool to below 30° C., package.

The modifications necessary to produce other polymer are made in accordance with procedures well known in the art and do not form a part of the present invention. Representative polymer compositions are shown in Table 4.

TABLE 4

| Representative Polymer Compositions (balance of monomers is methyl methacrylate and/or butyl methacrylate) | | | | |
| --- | --- | --- | --- | --- |
| Polymer No. | Functional Monomer | Abbreviation | Mole % | TBTM, Mole % |
| 1 | dimethylaminoethyl methacrylate | DMAEMA | 40 | 10 |
| 2 | dimethylaminoethyl methacrylate | " | 50 | 10 |
| 3 | dimethylaminoethyl | " | 60 | 10 |

TABLE 4-continued

Representative Polymer Compositions
(balance of monomers is methyl methacrylate
and/or butyl methacrylate)

| Polymer No. | Functional Monomer | Abbreviation | Mole % | TBTM, Mole % |
|---|---|---|---|---|
| | methacrylate | | | |
| 4 | dimethylaminoethyl methacrylate | " | 40 | 5 |
| 5 | dimethylaminoethyl methacrylate | " | 40 | 2.5 |
| 6 | t-butylaminoethyl methacrylate | t-BAEMA | 40 | 10 |
| 7 | t-butylaminoethyl methacrylate | " | 40 | 5 |
| 8 | t-butylaminoethyl methacrylate | " | 40 | 2.5 |
| 9 | dimethylaminoethyl methacrylate | DMAEMA | 15 | 15 |
| 10 | t-butylaminoethyl methacrylate | t-BAEMA | 15 | 15 |
| 11 | p-nitrophenyl acrylate | NPA | 30 | 10 |
| 12 | p-nitrophenyl acrylate | " | 15 | 15 |
| 13 | p-nitrobenzyl acrylate | NBA | 30 | 10 |
| 14 | p-nitrobenzyl acrylate | " | 15 | 15 |
| 15 | phenyl acrylate | PA | 40 | 10 |
| 16 | " | " | 30 | 15 |
| 17 | tributylsilyl acrylate | TBTSA | 30 | 10 |
| 18 | trichloroethyl acrylate | TCEA | 30 | 10 |
| 19 | dimethylaminoethyl methacrylate | DMAEMA | 30 | 10 |
| 20 | t-butylaminoethyl methacrylate | t-BAEMA | 30 | 10 |

SYNTHESIS PROCEDURE FOR FUNCTIONAL ACRYLATE AND METHACRYLATE ESTERS

The general procedure for the synthesis of the functional acrylate and methacrylate esters from the alcohol and acryloyl or methacryloyl chloride (Method A) or via transesterification of methyl acrylate or methyl methacrylate. (Method B) is described below.

Method A: Synthesis of p-Nitrobenzyl Acrylate 153.1 g (1 mole) p-nitrobenzyl alcohol, 101.2 g (1 mole) triethylamine and 250 ml of molecular sieve-dried acetone were placed in a 1 liter 3-necked flask, fitted with a stirrer, condenser, thermometer and dropping funnel, and cooled in an ice-water-acetone bath to below 5° C. 90.5 g (1 mole) acryloyl chloride in 100 ml of dry acetone was slowly added to the contents of the flask at 0°–5° C., stirred for an additional hour, then heated to reflux (60° C.) and held at reflux for 4 hours. The triethylammonium hydrochloride was removed by vacuum filtration and the acetone was removed on a rotary evaporator. The solid product was dissolved in 150 ml of warm methanol from which it crystallized on cooling. The yield was 45.0 g (23%) of white crystals, mp=50.0°–50.9° C. 98% assay via iodine number titration. Chromatography showed a single component.

From the reaction of 52.3 g (0.5 m) methacryloyl chloride and 76.6 g (0.5 m) of p-nitrobenzyl alcohol and 50.6 g triethylamine was isolated 71.5 g (34.5%) of p-nitrobenzyl methacrylate as pale-yellow crystals, mp—87°–88° C.

In a similar manner, trichloroethyl acrylate was prepared from 149.4 g (1 mole) trichloroethanol and acryloyl chloride (99.5 g, 1.1 mole). The washed and solvent-stripped crude product was vacuum distilled at 41°–44° C. and 0.7 mm Hg to give 69.3% of colorless liquid.

Method B: Preparation of Acrylic Monomers by Transesterification 2.5 moles of methyl acrylate, 1 mole of corresponding alcohol, 2 g of Phenothiazine as polymerization inhibitor and 3.6 g of dioctyltin oxide as catalyst were placed in a three necked flask equipped with a stirrer, a thermometer and a distillation column packed with glass beads, condenser and receiver. The mixture was heated at a temperature range of 75°–96° C. and the methanol-methyl acrylate azeotropic mixture distilled off in the range of 64°–80° C. As methyl acrylate is co-distilled with methanol, virgin methyl acrylate is added to compensate for total distillate off. After 10 hours, the transesterification was completed when the temperature of reaction liquid reached 96° C. The resulting mixture was distilled under pressure of 4–8 mm Hg to distill off unreacted methyl acrylate and then product. The analysis of the resulting product by the infrared absorption spectrum method (IR method), the gas chromatography (GC method) and the nuclear magnetic resonance spectrum method (NMR method) confirmed the structure of the product.

Triorganosilyl Acrylates

Triorganosilyl acrylates and methacrylates were prepared by the method described in Journal of General Chemistry of the USSR, Vol. 36, No. 4, pages 705–707, 1966.

Procedure for Measuring the Rate of Hydrolysis of Ground Polymer Films

The polymer hydrolysis rate is determined in accordance with the following procedure.

The hydrolysis of polymer films in pH=9 water at 35° C. was measured by back titrating the polymer free acid with standardized KOH at 24 hour intervals using the procedure described below:

Hydrolyses were conducted in a single neck, 300 ml Florence flask, stirred by a $\frac{3}{4}''$ Teflon coated magnetic stirrer, immersed in a thermostatically-controlled water bath at 35°+1° C. under an inert atmosphere obtained by bubbling nitrogen below the surface of the resin-water mixture for about one half hour then sealing the flask. The flask contained 150 ml of distilled water at a pH of 9.0 with KOH and 5.0 g of vacuum dried polymer film pulverized in a Waring blender for 20–30 seconds. The pH was measured on an Orion model 601A Digital Ionalyzer pH Meter using a combination glass/KCL electrode. Every 24 hours the contents of the flasks were back-titrated to pH 9.0 with standardized KOH and the number of milliequivalents used was calculated. The test was terminated after five consecutive 24-hour titrations.

The following Table shows the results of the polymer hydrolysis tests. Polymers which show hydrolysis rates above $5 \times 10^{-4}$ meq/hr are capable of serving as binders for water-insoluble sea-water erodible antifouling paints. It should be noted that the test indirectly confirms the efficacy of state-of-the-art tributyltin copolymers since even at a 33 mole % level this copolymer hydrolyzed at a rate which would indicate suitability as an antifouling paint binder.

TABLE 5

Hydrolysis of Functional Monomer-Tributyltin Methacrylate Copolymers at 35° C. in pH 9 Medium

| Polymer No. | Functional Monomer | Mole % in Polymer | TBTM, Mole % in Polymer | meq. Base ($10^4$) Consumed per hr. |
|---|---|---|---|---|
| 5-1 | — | — | 33 | 12 |
| 5-2 | — | — | 10 | 4 |
| 5-3 | DMAEMA | 70 | — | 14 |
| 5-4 | DMAEMA | 60 | — | 14 |
| 5-5 | DMAEMA | 55 | — | 10 |
| 5-6 | DMAEMA | 50 | — | 9 |
| 5-7 | DMAEMA | 25 | — | 2 |
| 5-8 | DMAEMA | 60 | 10 | 57 |
| 5-9 | DMAEMA | 40 | 10 | 44 |
| 5-10 | DMAEMA | 40 | 5 | 8 |
| 5-11 | t-BAEMA | 70 | — | 30 |
| 5-12 | t-BAEMA | 50 | — | 11 |
| 5-13 | t-BAEMA | 40 | 10 | 5(a) |
| 5-14 | t-BAEMA | 40 | 5 | 9 |
| 5-15 | t-BAEMA | 40 | 2.5 | 8 |
| 5-16 | NPA | 30 | 10 | 86 |
| 5-17 | PA | 40 | 10 | 8 |
| 5-18 | BMA Control | 50 | — | 2 |
| 5-19 | DMAEMA | 15 | 15 | 5 |
| 5-20 | t-BAEMA | 15 | 15 | 4 |

(a) particles agglomerated retarding hydrolysis

Generally it has been found that polymers whose hydrolysis rates corresponding to greater than 5 milliequivalents of base consumed per hour (equal to free carboxylate polymer formed on hydrolysis) are capable of eroding in moving seawater and providing antifouling paints which can control fouling when toxicants are incorporated therein.

The economic requirements associated with the production of antifouling paints, dictate that the concentration level of the hydrolyzable comonomer and the TBTM be minimized while the methyl methacrylate, butyl methacrylate, etc., be maximized. It would thus appear from Table 5, in particular the 10% TBTM, 25% DMAEMA, 15/15% DMAEMA/TBTM and 15/15% tBAEMA/TBTM systems of runs 2, 7, 19 and 20 respectively, that DMAEMA and t-BAEMA cannot be used with low levels of TBTM in terpolymers to produce erodible paint binders.

With respect to the unpredictability of the interaction or coaction of TBTM with a comonomer such as t-BAEMA or DMAEMA, it is important to note that in a copolymer containing 40% DMAEMA, increasing the TBTM level from a level of 5% to 10% dramatically increased the hydrolysis rate while increasing the TBTM level to 15% produced inadequate results when the DMAEMA level was decreased to 15%.

It is not readily ascertainable as to whether there is either a synergistic effect between the TBTM and the comonomers of the invention or concentration threshold effects which must be met to achieve the desired results. Moreover, it should be recognized that the theory of operation is not a part of the invention and theoretical discussions are intended for purposes of clarity and not by way of limitation of the invention.

The surprising effects of incorporating low levels of organotin methacrylate in certain functional acrylate polymers can be seen from a detailed analysis of Table 5. Polymer No. 5-6 containing 50 mole % DMAEMA alone shows a low hydrolysis rate of $9 \times 10^4$ milliequivalents per hour under the conditions of the test. By extrapolation a 40 mole % DMAEMA polymer would be expected to hydrolyze at an even lower rate of $5-7 \times 10^{-4}$ milliequivalents per hour. As shown in example Polymer No. 5-9, the incorporation of 10 mole % TBTM in the polymer which in itself does not hydrolyze (see Polymer No. 5-2), causes a large increase in hydrolysis rate to $44 \times 10^{-4}$ milliequivalents per hour (Polymer No. 5-9). Similarly, the hydrolysis rate of Polymer No. 5-4 containing 60 mole % DMAEMA is increased from $14 \times 10^{-4}$ milliequivalents per hour to $57 \times 10^{-4}$ milliequivalents per hour by the incorporation of 10 mole % TBTM (Polymer No. 5-9). It is seen that 5 mole % TBTM is insufficient to induce a large increase in the hydrolysis rate of a 40 mole % DMAEMA polymer. Similarly from examples of Polymers 5-14 and 5-15, a few % TBTM is sufficient to increase the hydrolysis rate of a tin-free t-BAEMA polymer containing about 40 mole % t-BAEMA almost to the level of a 50 mole % t-BAEMA polymer.

Conversely, from another point of view, it can be seen that the incorporation of these organic functional acrylates and methacrylates into non-hydrolyzing, non-eroding copolymers containing low levels of organotin acrylate or methacrylate polymers co-polymerized with non-functional organic ester acrylates and methacrylates induce a surprising increase in the hydrolysis rate and erosion rate.

To further illustrate this point, static fouling panel tests were performed in Miami using test paint formula A described previously and tributyltin methacrylate copolymers with a non-functional acrylate ester, methyl methacrylate. The copolymers contained varying levels of TBTM. In addition, polymers were prepared incorporating low levels of TBTM but with the addition of various functional acrylate esters as comonomers. The results are shown in Table 6. Note that even with high levels of copper oxide in the paints, a minimum of 25 mole % TBTM must be incorporated by co-polymerization in the binder polymer to achieve control of fouling in the absence of any functional monomer. At 20 and 10 mole % TBTM, the paint begins to fail in 6 months in the absence of functional comonomer.

The dramatic improvement in performance in such systems on the incorporation of the functional acrylate ester monomers DMAEMA and t-BAEMA is shown in Table 6.

TABLE 6

Effect of Polymer Composition on Antifouling Performance

| Polymer No. | Functional Monomer in Binder Polymer | Mole % F.M. | Mole % TBTM in Binder Polymer | Fouling Rating (6 mo.) Sub. | Fouling Rating (6 mo.) W/L |
|---|---|---|---|---|---|
| 6-1 | — | — | 25 | 0 | 0 |
| 6-2 | — | — | 20 | + | ++ |
| 6-3 | — | — | 10 | ++++ | ++++ |
| 6-4 | DMAEMA | 40 | 10 | $0^a$ | $0^a$ |
| 6-5 | t-BAEMA | 40 | 10 | 0 | 0 |
| 6-6 | t-BAEMA | 40 | 5 | $0^a$ | $0^a$ |
| 6-7 | t-BAEMA | 40 | 2.5 | $0^a$ | $+^a$ |

$^a$ = 3 month rating.

These results show the improvement in performance which is effected by the inclusion of DMAEMA, t-BAEMA and similar functional monomers in copolymers containing insufficient levels of tin (as TBTM) to control fouling and provide some degree of erosion. Table 6 also indicates that at a 2.5 mole % TBTM level, 40 mole % t-BAEMA is insufficient to provide good fouling control.

An optimum polymer formulation would thus contain greater than 2.5 mole percent but no greater than about 20 mole percent of the TBTM, in order to achieve the desired balance between antifouling properties and minimum tin content.

What is claimed is:

1. An antifouling paint for protecting marine surfaces, comprising in combination:
(a) toxicant and
(b) a film-forming, water insoluble, seawater erodible polymeric binder having recurring groups represented by the formula

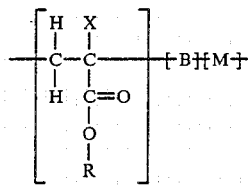

wherein
M is from greater than 2.5 to less than 25 mole percent of the unit from a tributyltin methacrylate or acrylate;
B is the unit from an ethylenically unsaturated monomer,
X is H or $CH_3$;
R is selected from the group consisting of:

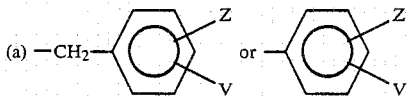

wherein
Z is $NO_2$, halogen or CN;
V is H, $NO_2$, halogen, CN or alkoxy;
(b) $-(CH_2)_n Y$ wherein
n is an integer from 1 to 4; and
Y is selected from the group consisting of

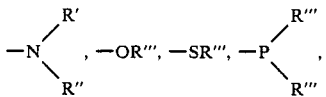

and wherein
R' is $C_1$ to $C_4$ primary, secondary or tertiary alkyl,
R'' is H or R';
R''' is alkyl or an aryl;
(c) haloalkyl having at least one trihalomethyl group, where the halogen is Br, F or Cl and the alkyl has at least two carbons;
(d) $-Si(R''')_3$ or $-Si(OR''')_3$, and R''' is alkyl or an aryl.

2. The paint of claim 1 wherein R is $-SiR_3'''$ or $Si(OR''')_3$, and R''' is a $C_1$ to $C_6$ primary, secondary or tertiary alkyl.

3. The paint of claim 2 wherein R is $-SiR'''_3$ or $-Si(OR''')_3$ and R''' is phenyl.

4. A water insoluble, seawater erodible film-forming polymer, said polymer having recurring groups represented by the formula

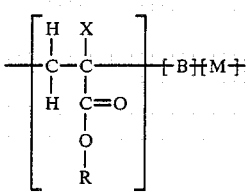

wherein
M is from greater than 2.5 to less than 25 mole percent of the unit from a tributyltin methacrylate or acrylate;
B is the unit from an ethylenically unsaturated monomer;
X is H or $CH_3$;
R is selected from the group consisting of:

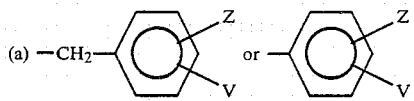

wherein
Z is $NO_2$, halogen or CN;
V is H, $NO_2$, halogen, CN or alkoxy;
(b) $-(CH_2)_n Y$ wherein
n is an integer from 1 to 4; and
Y is selected from the group consisting of

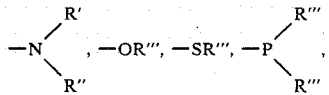

and wherein
R' is C to C primary, secondary or tertiary alkyl,
R'' is H or R';
R''' is alkyl or an aryl;
(c) haloalkyl having at least one trihalomethyl group, where the halogen is Br, F or Cl and the alkyl has at least two carbons;
(e) $-SiR'''_3$ or $-Si(OR''')_3$ and R''' is alkyl or an aryl.

5. The polymer of claim 4 wherein R is $-SiR_3'''$ or $Si(OR''')_3$, and R''' is a $C_1$ to $C_6$ primary, secondary or tertiary alkyl.

6. The polymer of claim 4 wherein R is $-SiR'''_3$ or $-Si(OR''')_3$ and R''' is phenyl.

7. The polymer of claim 4 wherein the polymer has an hydrolysis of at least $5 \times 10^{-4}$ milliequivalents per hour.

8. The polymer of claim 4, wherein the unit from a tributyltin methacrylate or acrylate is present in an amount from greater than 2.5 to about 20 mole percent.

* * * * *